United States Patent
Koizumi

[11] Patent Number: 5,349,920
[45] Date of Patent: Sep. 27, 1994

[54] SAFETY REFLECTOR MARKER

[76] Inventor: Toshio Koizumi, 26-2 Senju Motomachi, Adachi-ku Tokyo, Japan

[21] Appl. No.: 995,380
[22] Filed: Dec. 23, 1992
[51] Int. Cl.$^5$ .......................... B60Q 1/26; B60Q 7/02
[52] U.S. Cl. .................... 116/28 R; 116/30; 116/209; 359/515; 359/525
[58] Field of Search .................. 116/28 R, 30, 46, 56, 116/202, 209; 359/515, 520, 522, 525, 526, 527, 533, 548, 550, 553, 558; 63/13; 446/201

[56] References Cited

U.S. PATENT DOCUMENTS

| | | | |
|---|---|---|---|
| 244,918 | 7/1877 | Kitrell | D10/111 |
| 246,444 | 11,1877 | Kitrell | D10/111 |
| 1,635,915 | 7/1927 | White | 116/28 R |
| 2,120,578 | 6/1938 | Schulze | 74/12 |
| 2,192,817 | 3/1940 | Sanger et al. | 359/548 |
| 2,508,812 | 5/1950 | Burger | 116/28 R |
| 2,939,364 | 6/1960 | Doswell et al. | 88/81 |
| 3,064,536 | 11/1962 | Weingartner | 88/98 |
| 3,374,763 | 3/1968 | Browning | 116/63 |
| 3,435,213 | 3/1969 | Colbow et al. | 250/71 |
| 3,528,721 | 9/1970 | La Londe | 350/99 |
| 3,578,840 | 5/1971 | Richards | 350/99 |
| 3,626,766 | 12/1971 | Waldecker | 74/12 |
| 3,712,703 | 1/1973 | Newdigate | 350/62 |
| 3,758,190 | 9/1973 | Douglas | 359/525 |
| 3,785,337 | 1/1974 | Flowerday | 116/209 |
| 3,786,583 | 1/1974 | Revor | 40/39 |
| 3,894,790 | 7/1975 | Golden et al. | 359/533 X |
| 3,905,677 | 9/1975 | Lindner et al. | 359/550 |
| 3,907,404 | 9/1975 | McEwin | 359/526 |
| 3,938,395 | 2/1976 | Henecke | 74/12 |
| 3,954,236 | 5/1976 | Brown | 244/155 R |
| 3,974,369 | 8/1976 | Chmela et al. | 240/6.4 R |
| 4,046,098 | 9/1977 | Mancinelli et al. | 116/56 |
| 4,046,397 | 9/1977 | Kitrell | 280/289 R |
| 4,105,286 | 8/1978 | Curran | 350/99 |
| 4,108,535 | 8/1978 | Slaughter | 350/99 |
| 4,113,351 | 9/1978 | Kitrell | 350/99 |
| 4,116,154 | 9/1978 | Harris | 116/35 A |
| 4,140,363 | 2/1979 | Davis et al. | 350/6.8 |
| 4,204,746 | 5/1980 | Fisher | 350/99 |
| 4,466,698 | 8/1984 | Gantz | 359/525 X |
| 4,571,025 | 2/1986 | Stephen | 350/99 |
| 4,715,681 | 12/1987 | Johnson | 359/526 |
| 4,767,185 | 8/1988 | Lyons | 350/99 |
| 4,786,141 | 11/1988 | Kitrell | 350/99 |
| 4,852,970 | 8/1989 | Kitrell | 350/99 |
| 4,852,971 | 8/1989 | Kitrell | 350/99 |
| 5,189,531 | 2/1993 | Palmer et al. | 359/1 X |
| 5,229,882 | 7/1993 | Rowland | 359/530 |

FOREIGN PATENT DOCUMENTS

| | | | |
|---|---|---|---|
| 1009201 | 4/1977 | Canada | 240/47 |
| 0014986 | 9/1980 | European Pat. Off. | |
| 2622275 | 12/1977 | Fed. Rep. of Germany | |
| 0647919 | 6/1928 | France | 116/46 |
| 1237231 | 6/1960 | France | |
| 0532331 | 8/1955 | Italy | 116/28 R |
| 99358 | 9/1963 | Norway | |
| 0402560 | 12/1933 | United Kingdom | 359/548 |
| 936465 | 9/1963 | United Kingdom | |

*Primary Examiner*—Diego F. F. Gutierrez
*Assistant Examiner*—W. Morris Worth
*Attorney, Agent, or Firm*—Weingarten, Schurgin, Gagnebin & Hayes

[57] ABSTRACT

A light transmissive, including reflective and refractive visual warning device for attachment from the handle grips of a bicycle or motorcycle, to indicate the presence of the user to car drivers, is carried upon a short flexible suspension means, such as a pigtail or a ball chain or rotatable connector, permitting unrestricted motion and displacement, by which in the case of the ball chain or other rotatable connector permits spinning and other displacements due to motion. The device, preferably in the form of a double-faced triangle or multi-faced planar or curved fin shape may have one reflective face of reflective microspheres or retro-reflective micro-prisms and the other a holographic metallized mirror having an arrangement of multi-faceted reflective patterns possessing light refractive characteristics. One embodiment comprises a bicycle handgrip incorporating a wind-driven spinner rotatably mounted in the rear end of the grip, and having at least one light reflective, rotatable surface. Other embodiments may incorporate luminous coating material and/or light emitting diodes (LED's).

2 Claims, 3 Drawing Sheets

U.S. Patent    Sep. 27, 1994    Sheet 1 of 3    5,349,920
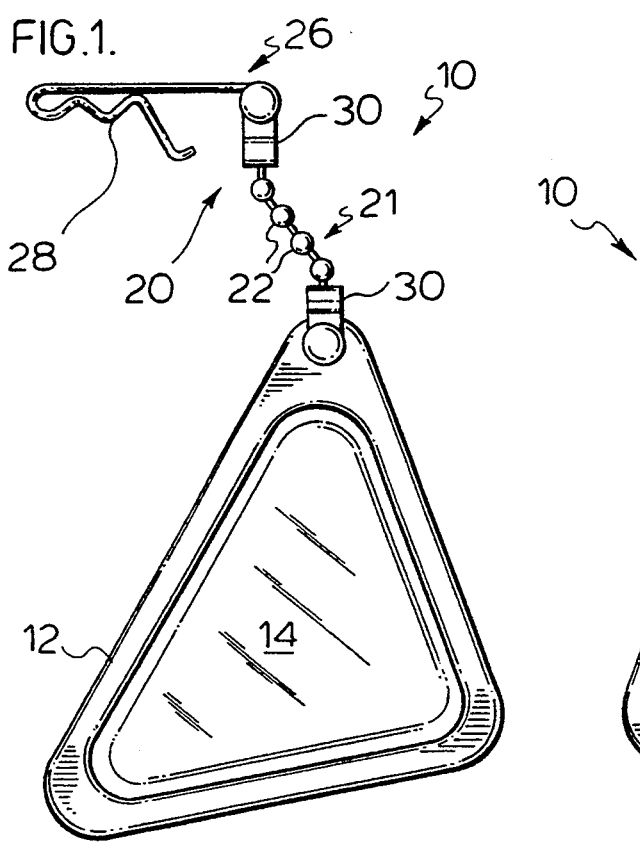
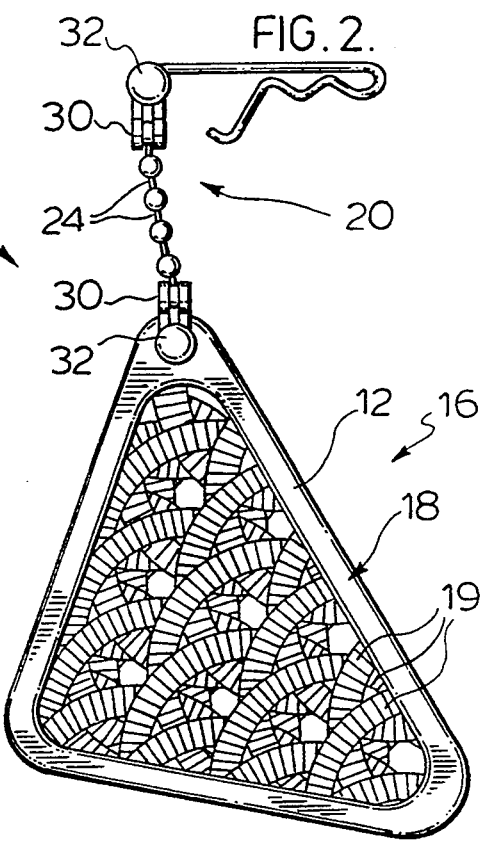
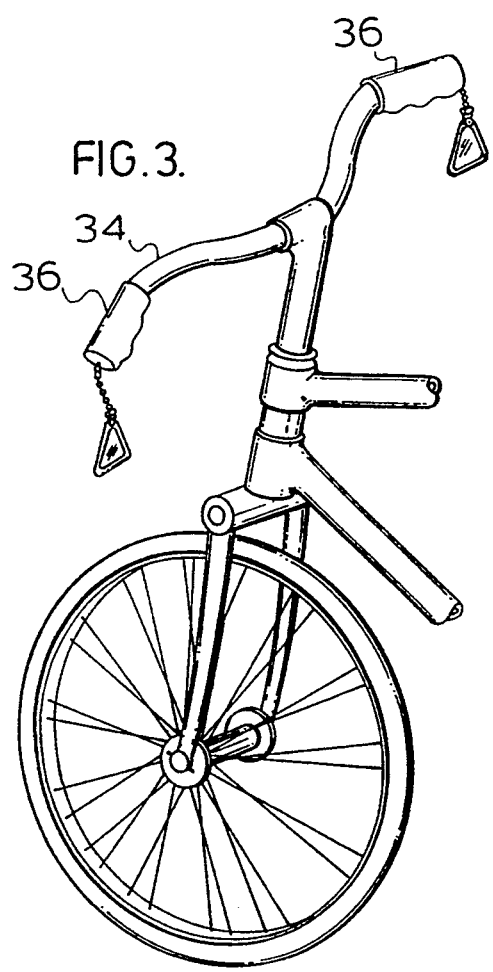
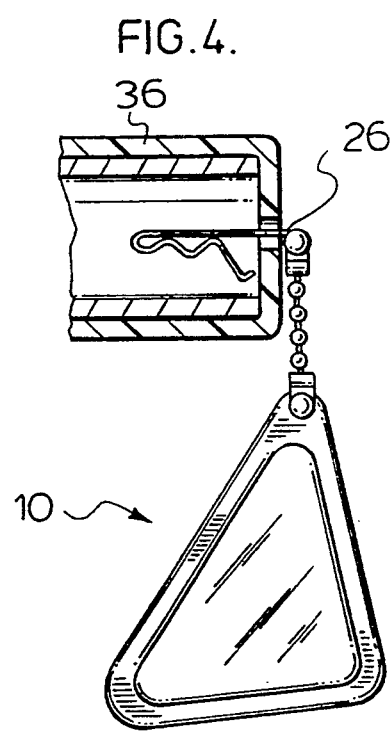

SAFETY REFLECTOR MARKER

TECHNICAL FIELD

This invention is directed to a safety device, and in particular to a portable light transmissive indicator for personal use on the person, bicycle or motorcycle of a user.

BACKGROUND ART

There occur an unduly large number of accidents each year involving motor vehicles coming into collision with slower moving road users, particularly cyclists.

A major reason for such accidents is the matter of visibility, more particularly noticeability. During the hours of darkness this problem is even more pronounced.

Existing safety devices that are used to promote the safety of certain road users include garments that incorporate various reflective types of material, and in the case motor-cyclists and cyclists, rear lights and red reflectors, including, in the case of bicycles reflectors mounted on the edges of the pedals, so as to capitalize on the relative motion of the pedals when rotating, and reflectors secured to the wheel spokes.

Such prior art moving reflector arrangements, while helpful, are somewhat limited in their usefulness owing to their restricted fields of relative motion, the directionality of their reflective surfaces, and their restricted locations.

DISCLOSURE OF THE INVENTION

In the following disclosure the term "light transmissive" relates to the reflection, refraction and/or emission of light.

The present invention provides a suspended light transmissive visual warning device for attachment to the handle bar or handle grips of a bicycle or motor cycle, to give warning indications of the presence of the user to other motorists. The warning device preferred embodiment has a substantially planar transmissive surface and flexible suspension means to permit substantially unrestricted re-orientation of the reflective surface. In a preferred embodiment a reflective surface incorporates reflective microprisms such that reflection of light is not dependent upon the orientation the reflective surface.

An alternative reflective surface may comprise a holographic metallized or stainless steel mirror having a pattern of multi-faceted light reflective patterns with light refractive characteristics.

In a preferred 2-sided embodiment a narrow reflective disc is provided having one face equipped with reflective microprisms and the reverse face of holographic metallized patterned mirror. The disc is preferably triangular, with two reflective faces thereto.

In one embodiment the flexible suspension means comprises a rotatable ball chain having rotatable end attachment means. In another embodiment the flexible suspension means may comprise a thin plastic "umbilical" or pigtail suitably attached such as by molding. A further embodiment incorporates a wind driven spinner or windmill, having reflective refractive surfaces and being totally suspended from a mounting structure that forms part of the handgrip.

In a further embodiment the use of a battery or bicycle generator in energizing relation with Light Emitting Diodes (LED's) may form one aspect of the invention.

BRIEF DESCRIPTION OF THE DRAWINGS

Certain embodiments of the invention are described by way of illustration without limitation of the invention thereto, reference being made to the accompanying drawings, wherein:

FIG. 1 is a side view of a visual warning device in accordance with the present invention;

FIG. 2 is a reverse side view of the FIG. 1 embodiment;

FIG. 3 is a perspective view of a portion of a bicycle having the subject device installed thereon;

FIG. 4 is a diametrical section of a handgrip of FIG. 3;

BEST MODE OF CARRYING OUT THE INVENTION

Figure 5:
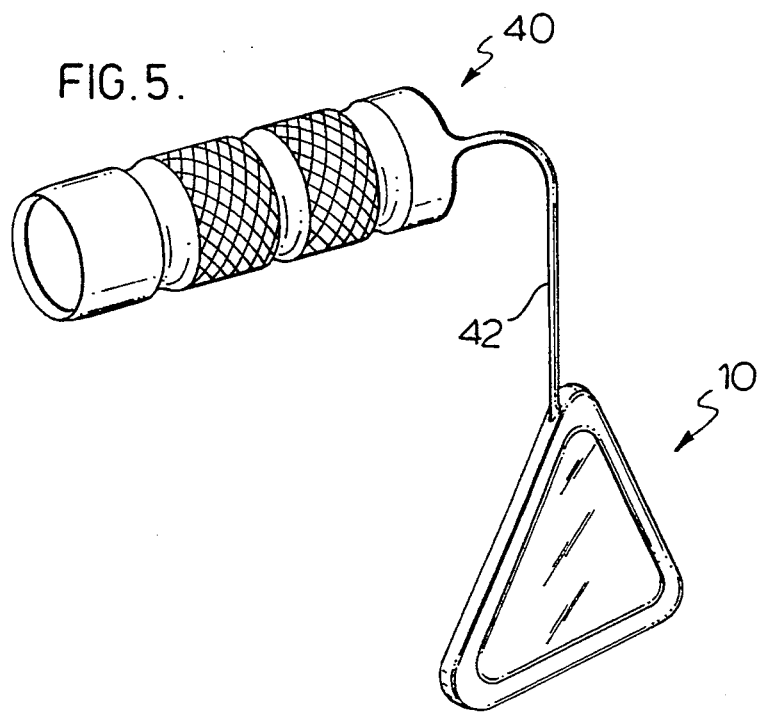
FIG. 5 is a perspective view of a handgrip having a molded plastic umbilical suspension means.

Referring to FIGS. 1 and 2, a visual warning device 10 is illustrated as being of irregular triangular form, although the specific shape thereof is not unduly significant.

The frame portion 12 encloses a reflective display surface 14 with sub-surface reflective microprisms there-beneath.

A reverse surface 16 comprises a reflective surface comprising a holographic metallized mirror 18 having a pattern of multi-faceted light reflective patterned surfaces 19 with light refractive characteristics which produce a range of vari-colored reflections.

The flexible support means 20 comprises a ball chain 21 comprising hollow balls 22 with interconnecting wire links 24, suspended from a flexible clip 26 having a serpentine spring leg 28. Slotted clip portions 30 secure the end balls 22 of chain 21 to the frame portion 12 and the flexible clip 26, respectively, by way of rivets 32.

Referring to FIGS. 3 and 4 a handle bar 34 has a pair of rubber handgrips 36. The flexible clips 26 are respectively inserted through the outer ends of handgrips 36, to secure the warning devices 10 in freely suspended relation therefrom.

Owing to the nature of the ball chain 21 each device 10 is free to rotate pivotally, while the flexible nature of the chains 21 permits the devices 10 to swing freely under the influence of windage and the many mechanical forces acting on the handlebars of the bicycle, when in use.

In use, the presentation of the reflective surfaces 14, 16 varies continuously, generating a flashing field of reflected light visible from all directions. Thus there is provided a multitude of reflective surfaces suspended for rapidly changing displacement to provide a visual warning field viewable from all directions.

The short length of the chains 21 precludes any knotting thereof, and minimizes the likelihood of any entanglement of the warning devices 10.

In the FIG. 5 embodiment a molded plastic hand, rip 40 has a molded pigtail suspension 42 with a warning device 10 suspended therefrom.

Figure 6:
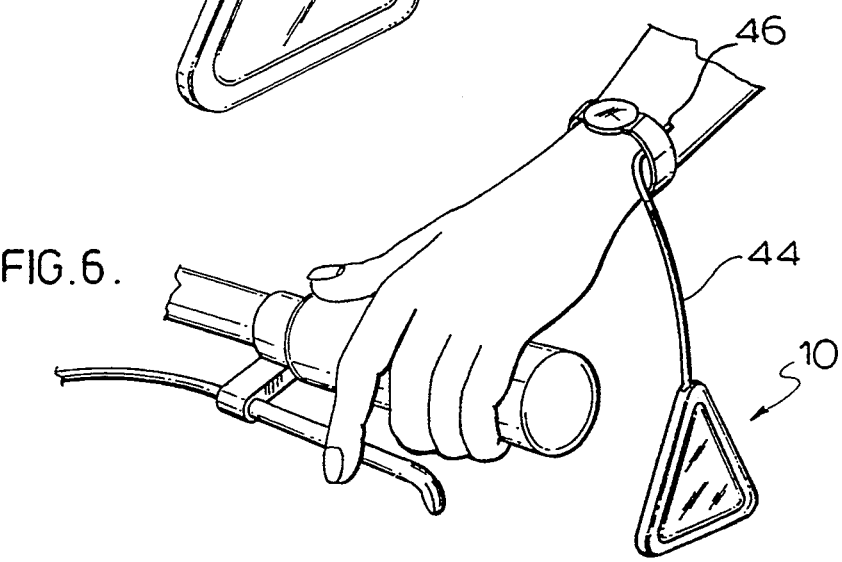
FIG. 6 is a perspective view showing the hand of a cyclist having a plastic umbilical suspension means attached by clip to the wristwatch strap.

In FIG. 6, a warning device 10, suspended by pigtail 44 is attached by clip 46 to the users wrist watch bracelet.

Figure 7:
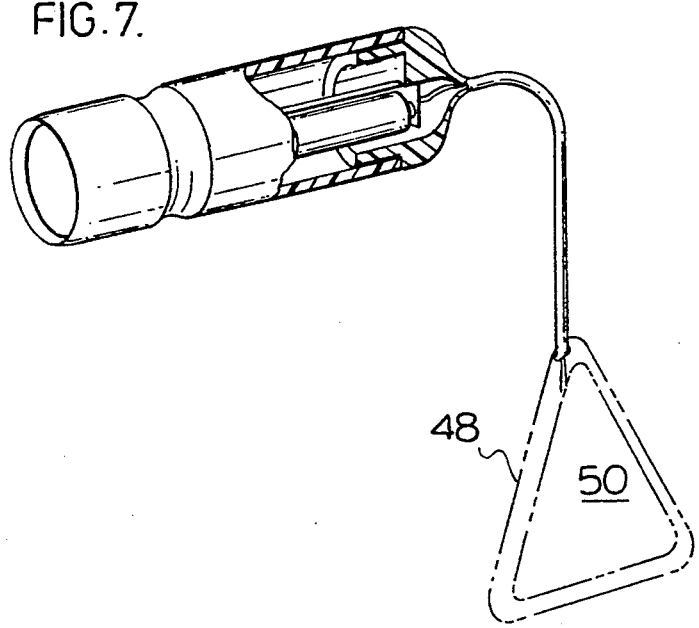
FIG. 7 is a side view, in part-section showing a bicycle handgrip containing a battery connected by a supporting flexible pigtail connection to a warning device incorporating LED's.

FIG. 7 shows an electrically energized warning device according to the present invention.

The Light Emitting Device (LED's) are located in at least one of the viewing faces 48, 50 of a safety device 52. The battery therefor (not shown) may be incorporated within the safety device 52. Alternatively, as illustrated, the battery 54 may be located, as in a handlebar grip, and connected to the safety device 52 by way of the suspending flexible pigtail 56.

A switching device (not shown) may be incorporated in the light transmissive device, or in the handlebar grip. It will be understood that the bicycle generator or dynamo may be used as the electrical energizing source.

Luminous material also may be incorporated as part of the light transmissive device.

Figure 8:
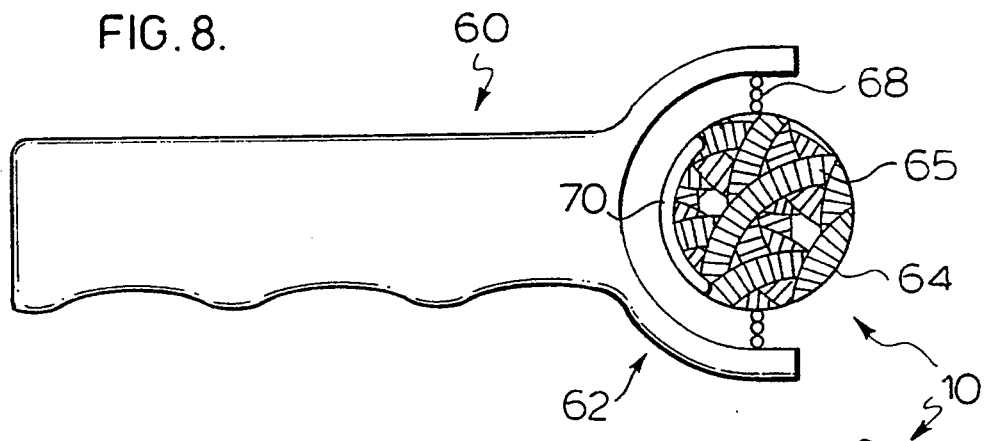
FIG. 8 is a side view of a bicycle handgrip incorporating a wind spinner reflective disc.
Figure 9:
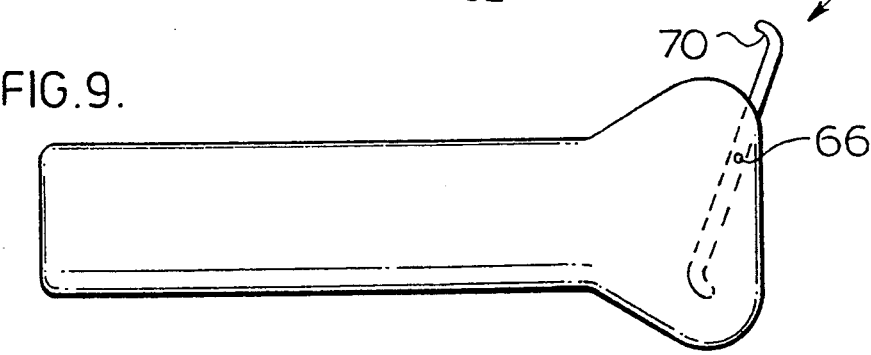
FIG. 9 is a top view of the FIG. 8 embodiment.

Referring to FIGS. 8 and 9, a bicycle handgrip 60 has a molded bifurcated bracket end portion 62.

A warning device 10 in the form of wind spinner 64 is rotatably mounted upon pivot 66, being suspended between bearing beads 68 for free rotation.

The spinner 64 has air scoop end portions 70 to enhance rotation of the spinner 64 under light air currents such as a breeze, or the passage of the bicycle.

In the illustrated embodiment the spinner 64 is shown as having the spin axis, pivot 66 laterally offset, to enhance its spin characteristics.

A surface 65 of the spinner 64 is illustrated as being a holographic metallized mirror.

Figure 10:
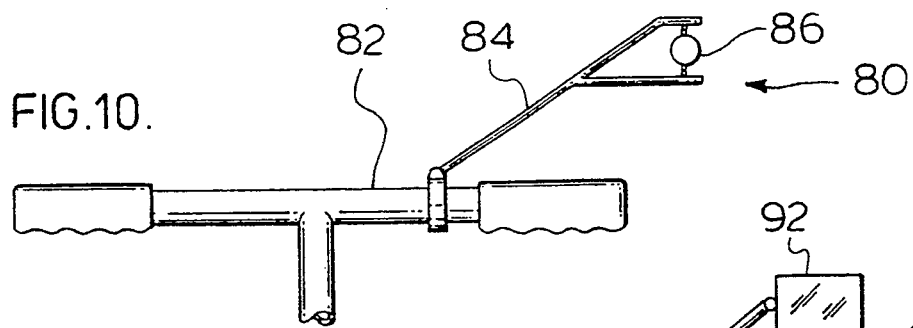
FIG. 10 is a rear view of a bicycle handle bar having a support mast for a spinner device.
Figure 11:
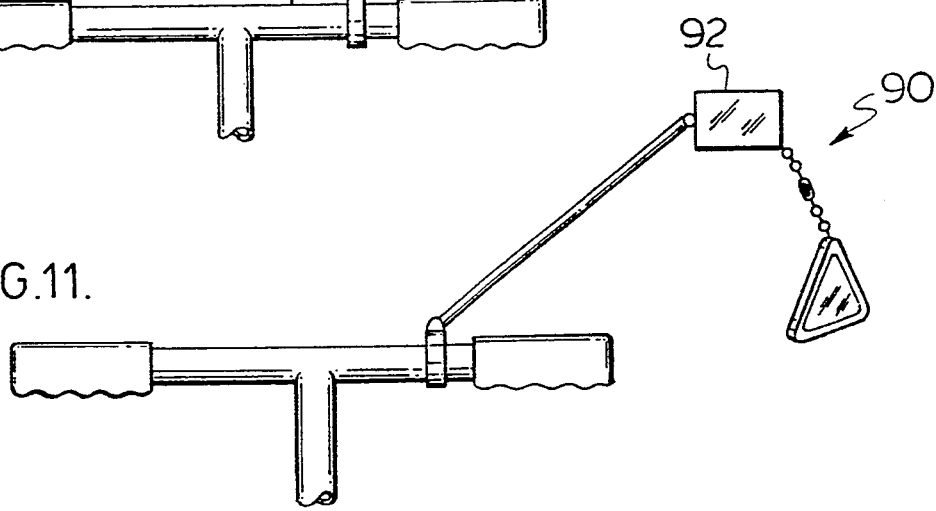
FIG. 11 is a like view showing attachment of a warning device from a bicycle mirror.

In the FIGS. 10 and 11, embodiments the subject warning device is supported from a handlebar of a cycle or motorcycle by way of a supporting mast/bracket, FIG. 10 or from a mirror, as in FIG. 11.

Thus, in FIG. 10 the arrangement 80 comprises a mast 84 secured by clipping to handle bar 82, the bracketed mast 84 carrying a light reflective spinner disk 86 in accordance with the invention.

In FIG. 11, the arrangement 90 includes a mirror 92 having a warning disk freely suspended there from.

Under usual night time conditions, reflection from the warning devices 10 may be seen as far as 100 meters away, while the flashing effect caused by motion of the display surfaces 14, 16 makes the user much more noticeable to motorists. However, the impression of motion, and reflection of light by the subject invention may be readily perceived even in broad daylight, sufficient to serve as a lifesaving alert to the presence of the user.

In addition to creating a flashing device relying upon the use of reflective and refractive surfaces, the present invention also provides battery operated devices corporating Light Emitting Diodes (LED's) as part of the present invention.

It is contemplated that the principles of construction may be incorporated, in combination with modified mounting means, for wearing upon garments or luggage, or as key rings.

INDUSTRIAL ACTIVITY

The subject visual safety device is readily produced at low cost, with a wide field of use, and with significant implications of enhanced safety.

What is claimed by letters patent of the U.S. is:

1. A warning device removably securable to an article and capable of reflecting light emitted from a light source, said warning device comprising:
    a planar reflector including one reflective surface having a plurality of reflective microprisms that reflect said light emitted from said light source substantially independently of an orientation of said reflector with respect to said light source; wherein said reflector further comprises a second reflective surface including a holographic, metallized mirror having a plurality of multifaceted, light-reflective patterns, each of said plurality of patterns having light-refractive characteristics;
    an attachment means for securing said warning device to said article; and
    a flexible hanger having a first end and a second end, said first end rotatably secured to said reflector and said second end rotatably secured to said attachment means, wherein said flexible hanger includes a rotatable chain; said hanger permitting substantially unrestricted reorientation of the reflector with respect to said light source.

2. The warning device as set forth in claim 1, wherein said attachment means includes a flexible clip.

* * * * *

UNITED STATES PATENT AND TRADEMARK OFFICE
CERTIFICATE OF CORRECTION

PATENT NO. : 5,349,920
DATED : September 27, 1994
INVENTOR(S) : Toshio Koizumi

It is certified that error appears in the above-indentified patent and that said Letters Patent is hereby corrected as shown below:

Column 1, line 23, "case motor-cyclists" should read --case of motor-cyclists---.

Column 3, line 7, "hand, rip" should read --handgrip--.

Signed and Sealed this

Twenty-eight Day of March, 1995

Attest:

BRUCE LEHMAN

Attesting Officer

Commissioner of Patents and Trademarks